United States Patent [19]
Lobner

[11] Patent Number: 5,259,720
[45] Date of Patent: Nov. 9, 1993

[54] ROTARY AND TILT SNOWMOBILE TRAILER APPARATUS

[76] Inventor: Anthony R. Lobner, Box 520171, Big Lake, Ak. 99652

[21] Appl. No.: 881,163

[22] Filed: May 11, 1992

[51] Int. Cl.$^5$ .............................................. B60P 1/28
[52] U.S. Cl. .................................. 414/483; 414/482; 414/485; 414/537; 104/46; 280/400; 384/428
[58] Field of Search ............ 414/467, 469, 480, 482, 414/483, 485, 490, 507, 501; 104/35, 36, 44, 45, 46, 47; 280/425.1, 493, 63, 105, 408, 400, 423.1; 296/181, 182, 43, 183, 1.1; 384/129, 428

[56] References Cited

U.S. PATENT DOCUMENTS

| | | | |
|---|---|---|---|
| 885,164 | 4/1908 | Magnuson | 104/46 |
| 2,628,733 | 2/1953 | Hale | 414/483 |
| 2,823,817 | 2/1958 | Holsclaw | 414/483 |
| 3,604,579 | 9/1971 | Jenkins | 414/482 |
| 3,720,336 | 3/1973 | Murray et al. | 414/482 X |
| 3,757,972 | 9/1973 | Martin | 414/537 |
| 3,874,683 | 4/1975 | Lawson | 414/483 X |
| 3,945,521 | 3/1976 | Decker | 414/483 |

FOREIGN PATENT DOCUMENTS

| | | | |
|---|---|---|---|
| 114031 | 4/1990 | Japan | 414/485 |
| 156920 | 8/1932 | Switzerland | 104/46 |

*Primary Examiner*—Frank E. Werner
*Attorney, Agent, or Firm*—Leon Gilden

[57] ABSTRACT

A trailer is arranged to have a rigid trailer frame, including radial rods projecting medially of the trailer frame, with the radial rods having rod rollers equally spaced relative to a cylindrical support collar. The cylindrical support collar rotatably mounts a trailer floor arranged for selective securement relative to the trailer and for selective rotation thereto. The trailer structure is arranged for tilting relative to an associated support leg that is selectively secured to a support tongue mounted overlying the leg.

6 Claims, 4 Drawing Sheets

ROTARY AND TILT SNOWMOBILE TRAILER APPARATUS

BACKGROUND OF THE INVENTION

1. Field of the Invention

The field of invention relates to trailer apparatus, and more particularly pertains to a new and improved rotary and tilting snowmobile trailer apparatus wherein the same is arranged for the selective tilting and rotary mounting of cargo and more particularly snowmobile apparatus thereon.

2. Description of the Prior Art

In the transport of snowmobiles to relatively remote locations, it is frequently desired to reorient the trailer structure to permit ease of unloading and loading of the trailer structure. The instant invention attempts to overcome deficiencies of the prior art permitting rotary positioning and tilting of the trailer structure to permit ease of loading and unloading of the snowmobiles.

Prior art tilt trailer structure is illustrated in U.S. Pat. No. 4,872,728 to Adams.

U.S. Pat. No. 4,711,461 to Fromberg sets forth a rotatable coupling relative to a trailer.

U.S Pat. No. 3,458,074 to Reiley sets forth a boat trailer having a tiltable and rotatable cradle frame.

U.S. Pat. No. 3,720,336 to Murray, et al. sets forth a rotating and tilting trailer bed for use in the transport of snowmobiles, motorcycles, and the like.

The prior art has heretofore set forth relatively complex structures to effect the tilting and rotatable mounting of a trailer bed and the instant invention attempts to overcome deficiencies of the prior art by providing for a rotary and tilt snowmobile trailer apparatus arranged for ease of use as well as effectiveness in construction and in this respect, the present invention substantially fulfills this need.

SUMMARY OF THE INVENTION

In view of the foregoing disadvantages inherent in the known types of trailer apparatus now present in the prior art, the present invention provides a rotary and tilt snowmobile trailer apparatus wherein the same is arranged for the rotary mounting and tilting of a trailer bed. As such, the general purpose of the present invention, which will be described subsequently in greater detail, is to provide a new and improved rotary and tilt snowmobile trailer apparatus which has all the advantages of the prior art trailer apparatus and none of the disadvantages.

To attain this, the present invention provides a trailer arranged to have a rigid trailer frame, including radial rods projecting medially of the trailer frame, with the radial rods having rod rollers equally spaced relative to a cylindrical support collar. The cylindrical support collar rotatably mounts a trailer floor arranged for selective securement relative to the trailer and for selective rotation thereto. The trailer structure is arranged for tilting relative to an associated support leg that is selectively secured to a support tongue mounted overlying the leg.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved rotary and tilt snowmobile trailer apparatus which has all the advantages of the prior art trailer apparatus and none of the disadvantages.

It is another object of the present invention to provide a new and improved rotary and tilt snowmobile trailer apparatus which may be easily and efficiently manufactured and marketed.

It is a further object of the present invention to provide a new and improved rotary and tilt snowmobile trailer apparatus which is of a durable and reliable construction.

An even further object of the present invention is to provide a new and improved rotary and tilt snowmobile trailer apparatus which is susceptible of a low cost of manufacture with regard to both materials and labor, and which accordingly is then susceptible of low prices of sale to the consuming public, thereby making such rotary and tilt snowmobile trailer apparatus economically available to the buying public.

Still yet another object of the present invention is to provide a new and improved rotary and tilt snowmobile trailer apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
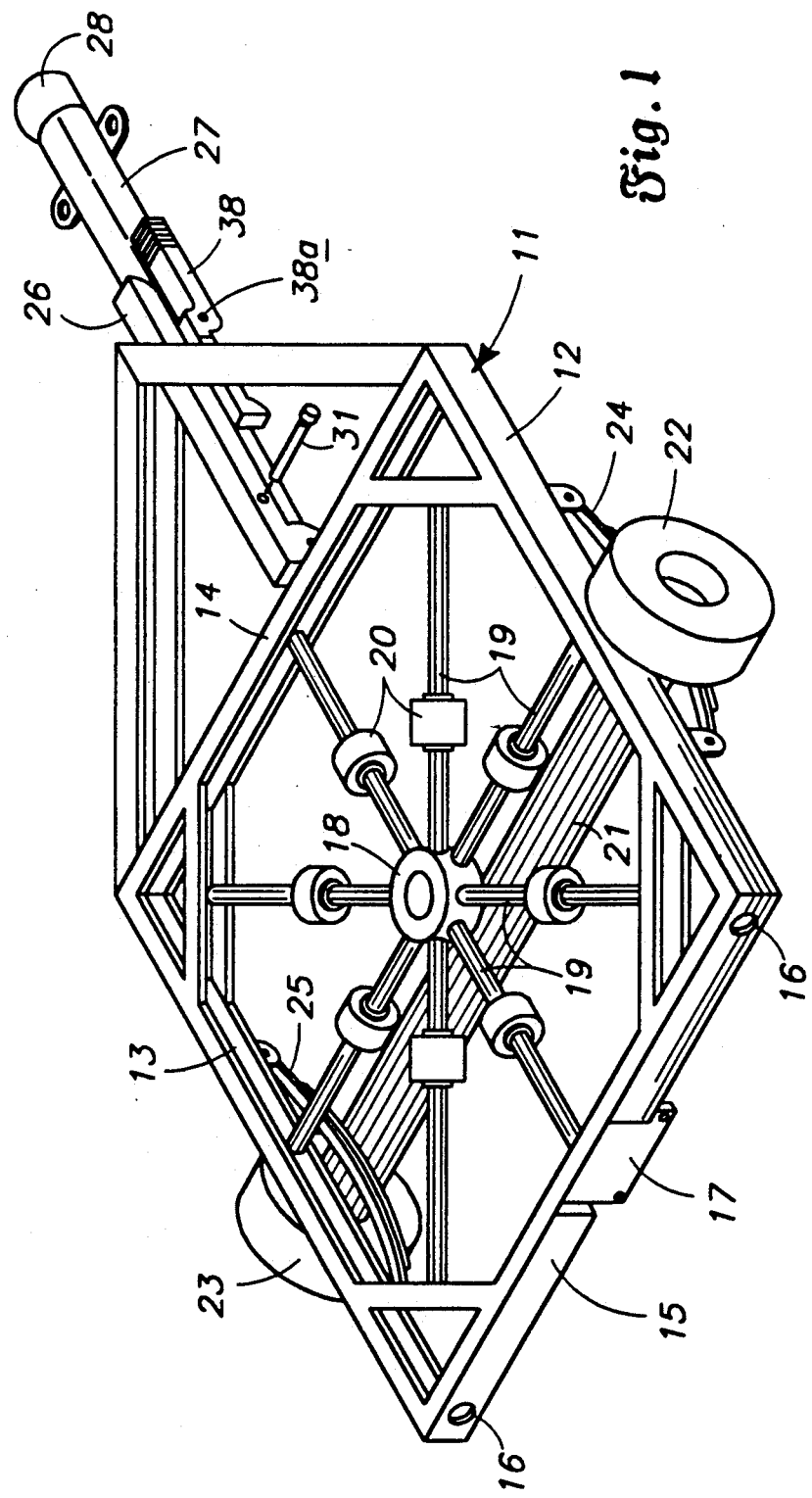
FIG. 1 is an isometric illustration of the trailer bed framework structure.
Figure 2:
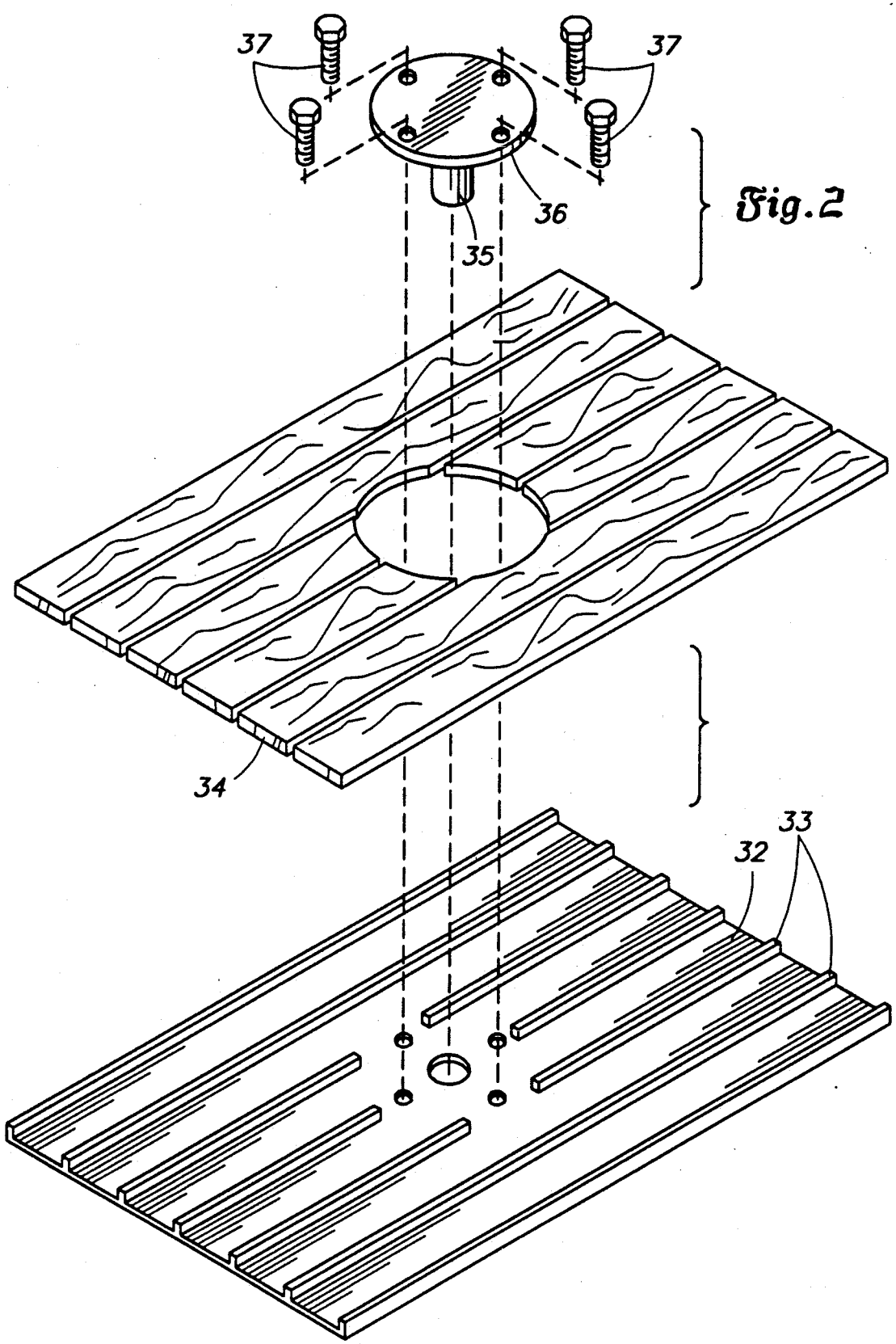
FIG. 2 is an isometric illustration of the trailer floor structure.

With reference now to the drawings, and in particular to FIGS. 1 to 5 thereof, a new and improved rotary and tilt snowmobile trailer apparatus embodying the principles and concepts of the present invention and generally designated by the reference numeral 10 will be described.

More specifically, the rotary and tilt snowmobile trailer apparatus 10 of the instant invention essentially comprises a rectilinear trailer frame 11 having a first side rail 12 spaced from and parallel a second side rail 13 in a coextensive relationship. A forward end rail 14 is mounted parallel to a rear end rail 15. A triangulated forward framework includes a trailer support tongue 26 fixedly and orthogonally mounted relative to the forward end rail 14 extending forwardly of the framework 11, with the trailer support tongue of a generally inverted U-shaped configuration to define a channel 26a (see FIG. 5) to receive a trailer support leg 27. The trailer support leg has a hitch socket 28 mounted to a forward distal end thereof to permit securement of the trailer structure relative to an associated transport vehicle (not shown). A pivot axle 29 pivotally mounts a rear distal end of the support leg 27 to the support tongue 26, as the support tongue 26 includes spaced parallel flange plates 30 extending downwardly relative to a rear portion of the support tongue 26, with a pivot axle 29 orthogonally directed through the flange plates 30 and through the rear distal end of the support leg 27 to permit pivotal mounting of the leg 27 relative to the tongue 26.

Recess signal lights 16 are mounted within the rear end rail 15, as well as the license plate flange 17.

A cylindrical support collar 18 is mounted medially of the trailer frame 11, wherein the support collar 18 defines an axis orthogonally oriented relative to the rectilinear frame 11. A plurality of radially positioned support rods 19 are fixedly mounted to the collar 18 and extend from the coar 18 into the interior of the frame rails 12-15. Each of the support rods 19 includes a rod roller 20 rotatably mounted thereabout, wherein the rod rollers are concentric relative to the axis of the collar 18. As the collar 18 defines a central bore therethrough, the collar is arranged for rotatable mounting of a bed assembly 47 (see FIG. 3), to he discussed in more detail below.

Figure 3:
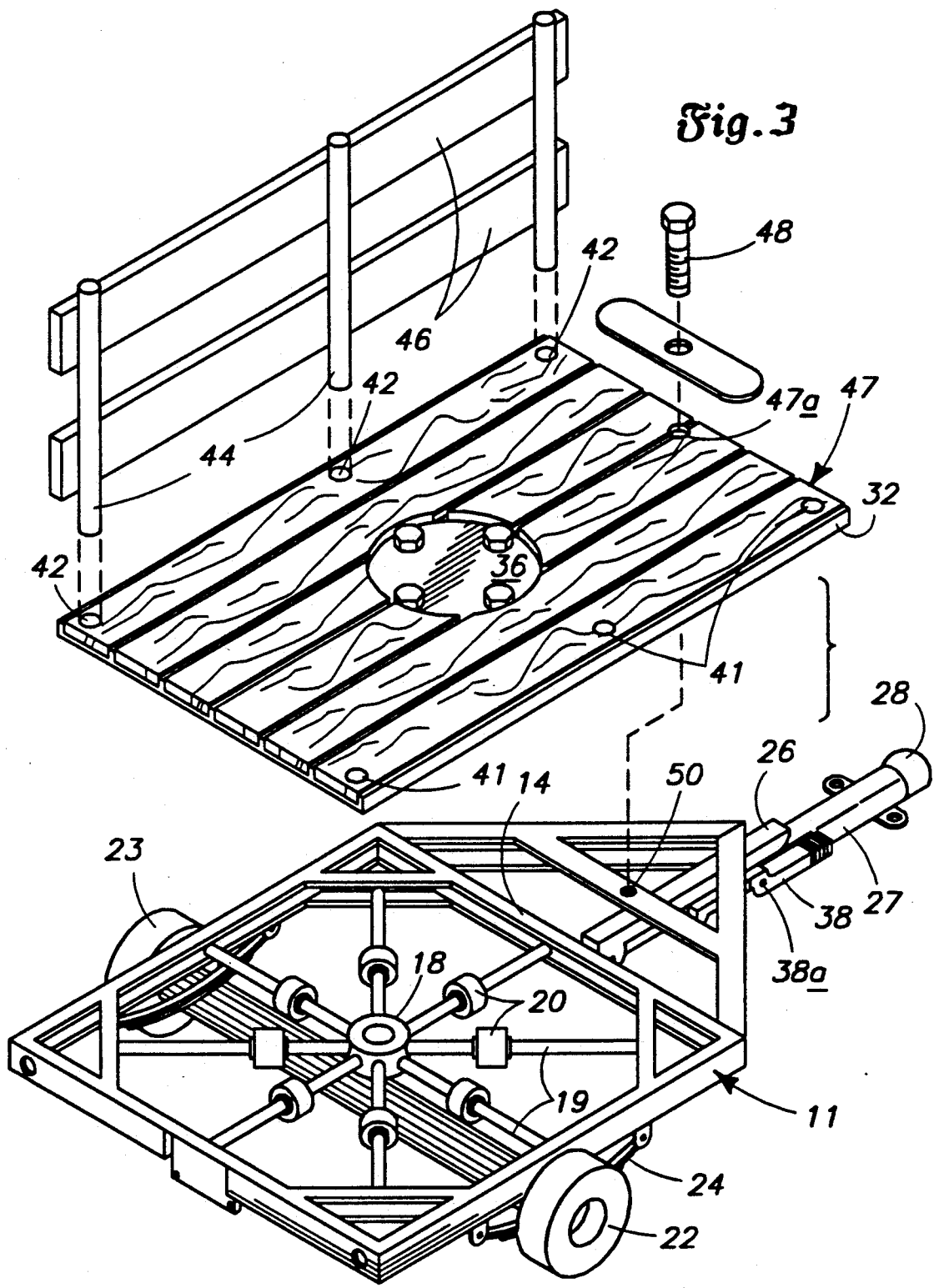
FIG. 3 is an isometric illustration of relative mounting of the trailer floor relative to the framework.
Figure 4:
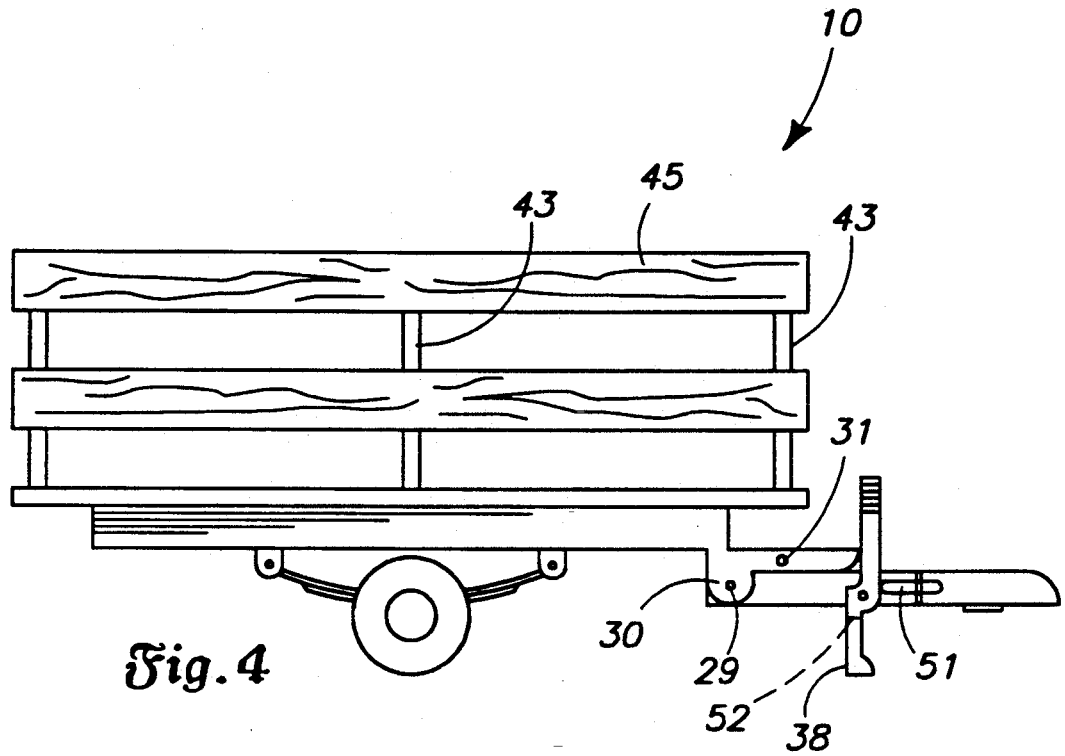
FIG. 4 is an orthographic side view of the trailer structure in a first position.
Figure 5:
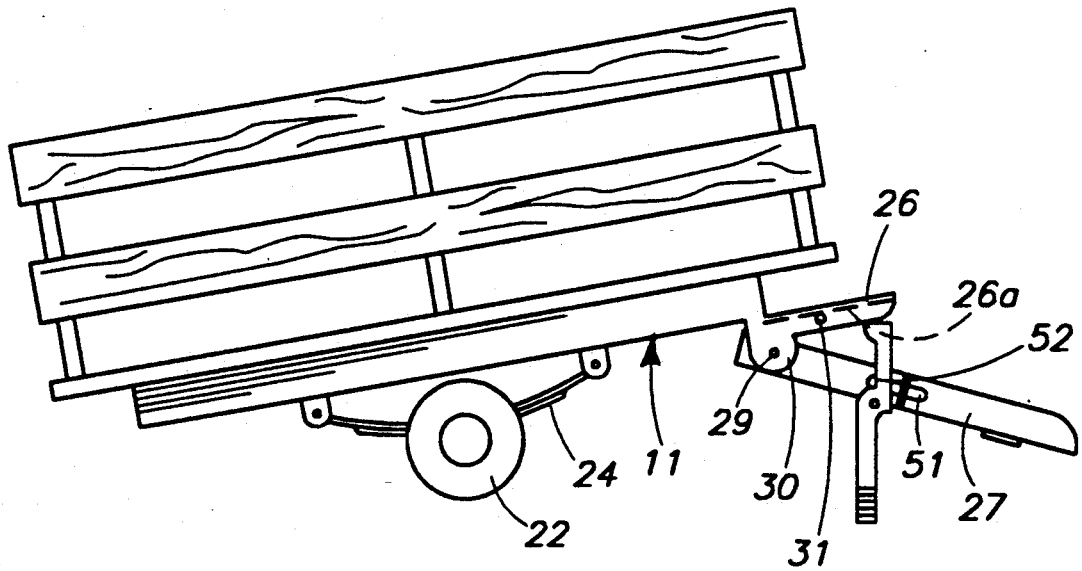
FIG. 5 is an orthographic side view of the trailer in a tilted second position.

With reference to FIG. 1 illustrates that a lock pin 31 is received through the trailer tongue 26 and the support leg 27 when the trailer tongue receives the support leg 27 in contiguous relationship, in a manner as illustrated in FIG. 4 in a first position, wherein the lock pin is removed to permit pivotment of the trailer tongue and the support leg to a second spaced position, as illustrated in FIG. 5, to permit tilting of the associated trailer structure. The bed assembly 47 includes a support table 32 having strengthening ribs 32 mounted thereon to secure a support table floor 34 thereon. A cylindrical hub 35 is directed medially through the support table 32 projecting therebelow and mounted to the support table, as well as the support table floor, by the use of hub fasteners 37. The cylindrical hub 35 is accordingly directed within the collar 18 as indicated in FIG. 3.

The FIGS. 4 and 5 illustrate the use of the tilt lever 38 that is pivotally mounted about a tilt lever axle 38a to the support leg 27. Pivotment of the tilt lever 38 from a first position to effect abutment of the head of the tilt lever in abutment with the support tongue 26 effects pivotment of the trailer structure, in a manner as illustrated in FIG. 5. The use of a slide latch bar 51 slidably mounted to the leg 27 is received through a tilt lever bore 52 to fixedly secure the tilt lever in a pivoted orientation as illustrated in FIG. 5.

It should be noted that the support table floor 34 includes a floor first side edge 39 spaced from and parallel a floor second side edge 40, with respective first and second side apertures 41 and 42 directed through the floor adjacent a respective first and second side edges 39 and 40. Respective first and second trailer walls are arranged to include first and second side wall legs 43 and 44 received within a respective first and second side aperture 41 and 42. First and second wall plates 45 and 46 are orthogonally directed across the legs 43 and 44 respectively to define the side wall structure.

To prevent unwarranted rotation of the bed assembly 47 relative to the framework 11, a lock pin 48 is arranged for projection through a bed assembly aperture 47a for reception within a frame plate bore 50 of a frame plate 49. The frame plate 49 is fixedly mounted to the forwardly extending triangular framework of the trailer structure and arranged in a parallel relationship forwardly of the forward end rail 14. Preferably, the frame plate bore 50 is internally threaded to receive an externally threaded lock pin 48 in securement of the bed assembly 40 to the frame 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rotary and tilt snowmobile trailer apparatus, comprising, a rectilinear trailer frame having a first side rail spaced from and parallel to a second side rail, a forward end rail spaced from and parallel a rear end rail, and a triangular frame projecting forwardly of the forward end rail, and a rigid trailer support tongue orthogonally and medially intersecting the forward end rail projecting forwardly of the forward frame rail and bisecting the triangular frame, with a trailer support leg pivotally mounted relative to the trailer support tongue at a rear distal end of the trailer support leg and at a rear distal end of the trailer support tongue adjacent the forward end rail, with a forward distal end of the support leg spaced from the forward end rail having a hitch socket mounted thereon, and tilt means mounted to the support leg for effecting rotation of the support tongue relative to the support leg, and a bed assembly rotatably mounted within the trailer frame, and the trailer frame includes a cylindrical support collar having its axis orthogonally oriented relative to the trailer frame, and the support collar positioned medially of the trailer frame, and including a plurality of radially and fixedly mounted support rods directed from the support collar to the first side rail, second side rail, forward end rail, and rear end rail, and each support rod including a support rod roller oriented at an equal distance relative to the axis, and the bed assembly includes a support table, the support table including a support table floor mounted thereon, and a cylindrical hub projecting medially of the support table and the support table floor projecting below the support table floor, with the cylindrical hub rotatably mounted and received within the support collar, with the support table floor rotatably supported by each rod roller, and a forward frame plate projecting forwardly of and in parallel relationship relative to the forward end rail, with the forward frame plate including an internally threaded frame plate bore directed therethrough, and the bed assembly including a bed assembly aperture, the bed assembly aperture and the frame plate bore are spaced an equal distance relative to the axis of the support collar, and a fastener is arranged for reception through the bed assembly aperture and received within the frame plate bore.

2. An apparatus as set forth in claim 1 including a support axle mounted below the trailer frame orthogonally oriented relative to the first side rail and second side rail, with a first wheel and a second wheel rotatably mounted relative to the support axle and adjacent to and exteriorly of the trailer frame.

3. An apparatus as set forth in claim 2 including a lock pin, the lock pin is received orthogonally through the trailer support tongue and the trailer support leg when the support leg is positioned in contiguous adjacency relative to the support tongue, and the lock pin is arranged for removal relative to the support tongue and support leg to permit pivotment of the trailer frame relative to the support leg.

4. An apparatus as set forth in claim 3 wherein the tilt means includes a tilt lever, and a tilt lever axle directed through the tilt lever and received through the support leg adjacent the support tongue, the tilt lever arranged for pivotment about the tilt lever axle and for abutment with the support tongue to pivot the support tongue relative to the support leg when the lock pin is removed relative to the support tongue and the support leg.

5. An apparatus as set forth in claim 4 wherein the support table floor includes a first side edge spaced from and parallel a second side edge, and the floor includes first side apertures positioned adjacent the first side edge, and second side apertures positioned adjacent the second side edge, and a first side wall and a second side wall, the first side wall including first side wall legs arranged for reception within the first side apertures, and the second side wall including second side wall legs arranged for reception within the second side apertures.

6. An apparatus as set forth in claim 5 including a slide latch bar slidaby mounted along the support leg, and the tilt lever including a tilt bore, the slide latch bar arranged for reception within the tilt lever bore when the support tongue is pivoted relative to the support leg.

* * * * *